(12) United States Patent
Zhao et al.

(10) Patent No.: US 9,815,403 B2
(45) Date of Patent: Nov. 14, 2017

(54) LED DRIVER CHIP FOR CAR READING LIGHT AND STATE CONTROL METHOD THEREOF

(71) Applicant: Si-En Technology (Xiamen) Limited, Xiamen (CN)

(72) Inventors: Dongshi Zhao, Xiamen (CN); Aaron Reynoso, Xiamen (CN)

(73) Assignee: SI-EN TECHNOLOGY (XIAMEN) LIMITED, Xiamen, Fujian (CN)

( * ) Notice: Subject to any disclaimer, the term of this patent is extended or adjusted under 35 U.S.C. 154(b) by 0 days.

(21) Appl. No.: 15/368,689

(22) Filed: Dec. 5, 2016

(65) Prior Publication Data

US 2017/0197545 A1    Jul. 13, 2017

(30) Foreign Application Priority Data

Jan. 13, 2016  (CN) .......................... 2016 1 0019908
Jan. 13, 2016  (CN) .......................... 2016 1 0020904

(51) Int. Cl.
*H05B 33/08*    (2006.01)
*B60Q 3/76*    (2017.01)

(52) U.S. Cl.
CPC ........... *B60Q 3/76* (2017.02); *H05B 33/0815* (2013.01)

(58) Field of Classification Search
None
See application file for complete search history.

(56) References Cited

U.S. PATENT DOCUMENTS

2008/0252222 A1* 10/2008 Cusinato ............ H05B 33/0815
                                                                              315/161
2014/0159593 A1*  6/2014 Chu ................... H05B 33/0824
                                                                              315/191

* cited by examiner

*Primary Examiner* — Dedei K Hammond
(74) *Attorney, Agent, or Firm* — Leong C. Lei

(57) ABSTRACT

An LED driver chip for a car reading light and a state control method thereof are provided. The LED driver chip includes a state machine control circuit module, a state machine output logic module, a current on/off control logic circuit module, and a current source module. An OUT pin of the LED driver chip is connected with an LED. The LED driver chip determines the next state of LED current according to a driver chip PWM input signal, an EN pin low lever pulse input signal, and a present LED state, enabling the LED to switch among nine different states.

1 Claim, 4 Drawing Sheets

LED DRIVER CHIP FOR CAR READING LIGHT AND STATE CONTROL METHOD THEREOF

BACKGROUND OF THE INVENTION

1. Field of the Invention

The present invention relates to an LED, and more particularly to an LED driver chip for a car reading light and a state control method thereof.

2. Description of the Prior Art

LEDs are more and more widely used in automotive lighting systems because of the advantages of energy-saving, high efficiency, etc. However, for low-priced and middle-priced cars, the front and rear reading lights in the car generally use an incandescent light bulb with tungsten filaments as a light source.

FIG. 1 is a circuit diagram of a conventional car reading light with an incandescent bulb. A 12 volts power supply, an incandescent light equivalent to a resistor, and a tri-state switch including three connecting ways are provided. When the tri-state switch is pushed to the left, the incandescent light is lit. The current of the incandescent light is determined by the battery voltage divided by the equivalent resistance of the incandescent bulb; when the tri-state switch is pushed to the middle, the current of the incandescent light is controlled by the BCM output. When the BCM output is a low level close to 0 volt, the incandescent light is lit. The current of the incandescent light is determined by the battery voltage divided by the equivalent resistance of the incandescent bulb. When the BCM output is a high level approximate 12 volts, the incandescent light has no current. The light is off. The current of the incandescent light is approximately zero. When the tri-state switch is pushed to the right, one end of the incandescent light is connected to the battery, and the other end is open. The current is 0 ampere, and the incandescent light is off.

The brightness of the incandescent light is determined by the current value passing the incandescent light. The current value is determined by the voltage difference between two ends of the incandescent light divided by the equivalent resistance of the incandescent light. The resistivity of the tungsten filaments of the incandescent light will increase with an increase of temperature. As a result, the brightness of the incandescent light will vary with a temperature change. The jitter of the battery voltage will cause a jitter of the voltage difference between the two ends of the incandescent light, resulting in a flicker of the brightness of the incandescent light. Accordingly, the inventor of the present invention has devoted himself based on his many years of practical experiences to solve this problem.

SUMMARY OF THE INVENTION

In view of the drawbacks of the prior art, the primary object of the present invention is to provide an LED driver chip for a car reading light and a state control method thereof. LEDs are used instead of an incandescent light to improve the lighting efficiency and improve the brightness of a reading light against temperature interference and power jitter interference. In the meanwhile, a state machine is provided to control the output of the current source, which is better than a general digital system control method to achieve more complex functions for meeting the need of the practical application.

According to an aspect of the present invention, an LED driver chip for a car reading light is provided. The LED driver chip comprises a state machine control circuit module, a state machine output logic module, a current on/off control logic circuit module, and a current source module. The state machine control circuit module is connected with the state machine output logic module. The state machine output logic module is connected with the current on/off control logic circuit module. The state machine output logic module and the current on/off control logic circuit module are connected with the current source module through a logic gate circuit. The state machine control circuit module determines that what a next state is according to an input signal and a present state. When a next clock cycle comes, the next state gives the present state. A present state signal is output to the state machine output logic module. The state machine output logic module controls a plurality of output signals according to the present state for controlling the current source module to work in an AC control mode or a DC control mode or an AC/DC mixed control mode. The output signals of the state machine output logic module are input into the current on/off control logic circuit module for controlling the output current of the current source module to be gradually decreased to zero or to be gradually increased until setup.

According to another aspect of the present invention, a state control method of an LED driver chip for a car reading light is provided. An OUT pin of the LED driver chip is connected with an LED. The LED driver chip determines a next state of LED current according to three signals, namely, a driver chip PWM input signal, an EN pin low lever pulse input signal, and a present LED state, and according to conversion conditions and a control signal output formula SS=EN_EFF, PWM_ACT, LAST_STATE_PWM, PWM_PIN, GA<1>, GA<62>;

(1) Initial OFF: an initial off state, namely, an initial state of the driver chip, a Fade mode, an EN input signal controlling the LED current;

(2) Fade In: a state that DC current of the LED is gradually increased, the EN input signal controlling the DC current of the LED to gradually increase;

(3) LED ON Due to Fade In: a state that the DC current of the LED reaches a maximum output value, the result that EN input enables the LED current;

(4) Fade Out: a state that the DC current of the LED is gradually decreased, the EN input signal controlling the DC current of the LED to gradually increase;

(5) LED On Due to PWM is ON: a state that the DC current of the LED is the maximum output value, the result that PWM input enables the LED current;

(6) LED PWM Ramp Down: a state that a PWM input signal gets the control of the LED current and the duty cycle of the LED current is gradually decreased;

(7) LED Fade In From LED=0: a state that the DC current of the LED is gradually increased from 0 ampere, the EN input signal controlling the DC current of the LED to gradually increase;

(8) LED PWM Ramp Up: a state that the PWM input signal gets the control of the LED current and the duty cycle of the LED current is gradually increased;

(9) LED PWM Mixed Fade Out: a state that the LED current is simultaneously controlled by the EN input signal and the PWM input signal.

Compared to the prior art, the present invention has obvious advantages and beneficial effects. The LED current of the present invention is supplied by the current source module. When the temperature and the battery voltage change, the LED current is almost unchanged to greatly improve the LED brightness against the temperature change and the interference of power supply voltage change. The LED driver chip is built-in with the current on-off control logic circuit module, enabling the LED to light or extinguish gradually so as to change the brightness of the LED linearly for the user to feel comfortable. Furthermore, the LED driver chip is built-in with the state machine control circuit module. The output of the current source is controlled by the state machine, which is better than a digital system control method to achieve more complex functions for meeting the need of the practical application.

The LED driver chip of the present invention is applied to a car reading light. The car reading light uses LEDs instead of instead of an incandescent light. The efficiency of LEDs is high than that of an incandescent light to save electric energy. Besides, this can achieve the following two functions:

1. The action of opening and closing the car door controls the on and off state of the light. For example, the action of opening the door can control the light to gradually light up. The action of closing the door can control the light to gradually extinguish.

2. A button or a switch is provided for the user to press the button or switch manually to control the light in a lighted state or in a extinguished state.

The LED driver chip of the present invention determines the next state of the LED current according to three signals, namely, a driver chip PWM input signal, an EN pin low lever pulse input signal, and a present LED state and according to conversion conditions and a control signal output formula SS=EN_EFF, PWM_ACT, LAST_STATE_PWM, PWM_PIN, GA<1>, GA<62>. The LED can be switched among nine different states through twenty-two paths. The output of the current source is controlled by the state machine, which is better than a digital system control method to achieve more complex functions for meeting the need of the practical application.

DETAILED DESCRIPTION OF THE PREFERRED EMBODIMENTS

Embodiments of the present invention will now be described, by way of example only, with reference to the accompanying drawings.

Figure 1:
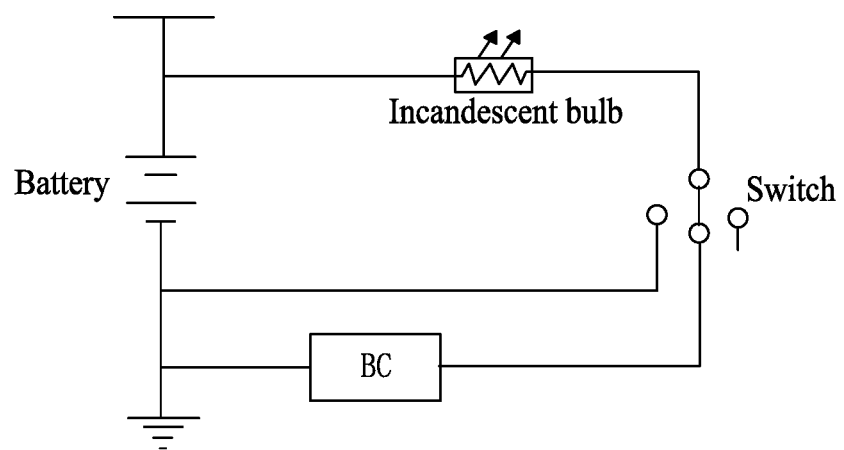
FIG. 1 is a circuit diagram of a conventional car reading light.
Figure 2:
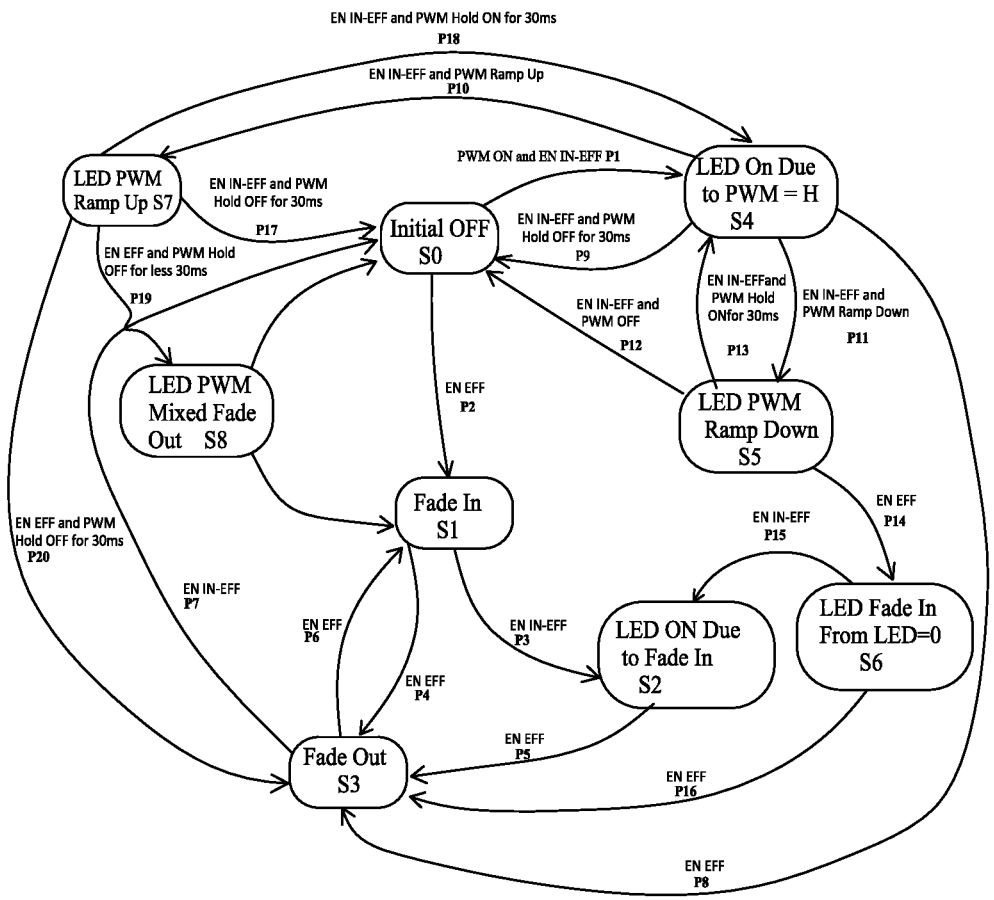
FIG. 2 is a state conversion diagram of a state machine according to an embodiment of the present invention.
Figure 3:
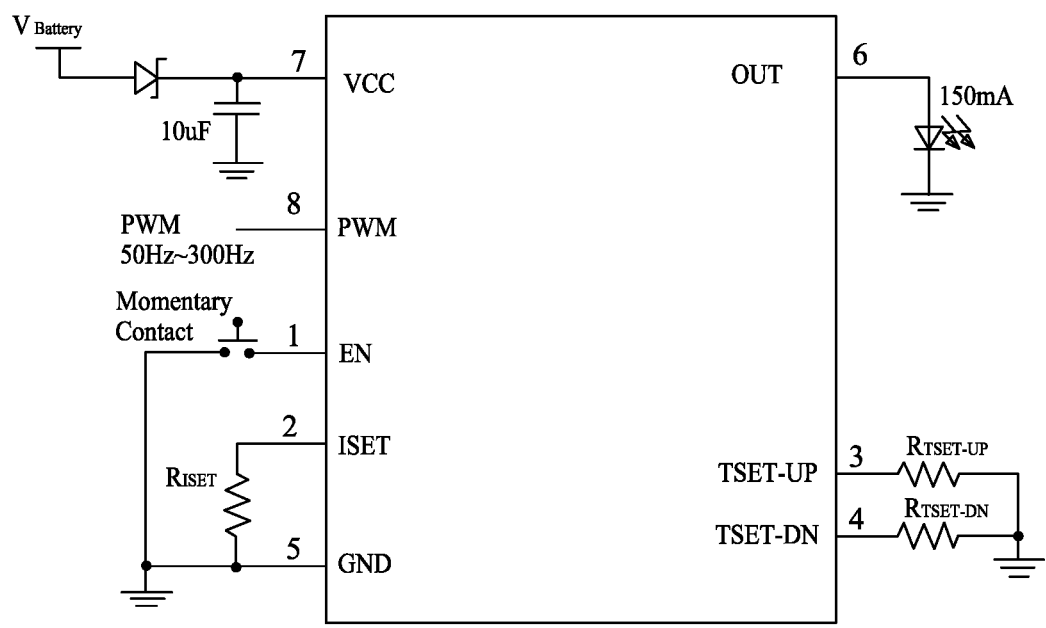
FIG. 3 is a circuit diagram of an application of an LED driver chip according to an embodiment of the present invention.
Figure 4:
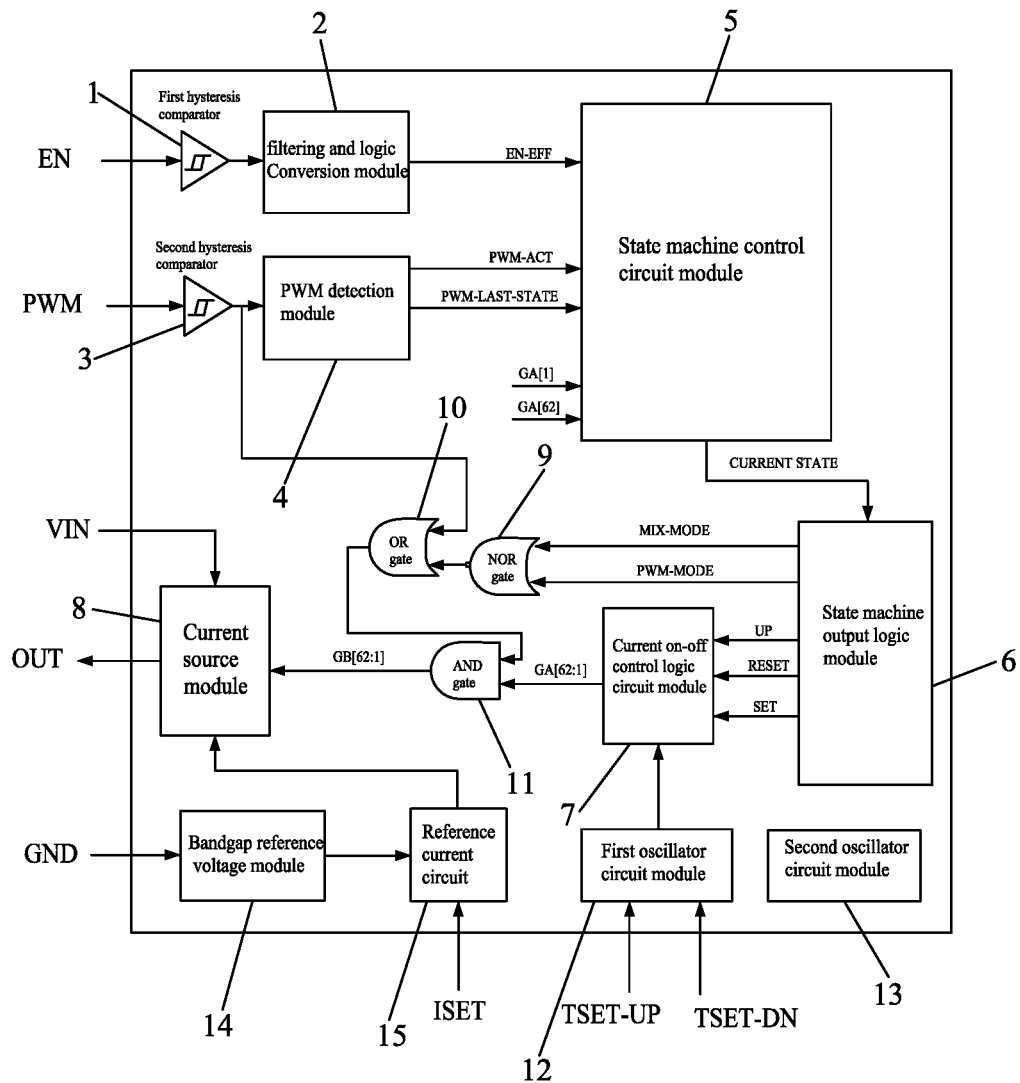
FIG. 4 is a block diagram of the LED driver chip according to an embodiment of the present invention.

FIG. 2 to FIG. 4 illustrates a preferred embodiment of the present invention. The present invention discloses an LED driver chip of a car reading light for controlling the car LED reading light. An OUT pin of the LED driver chip is connected with an LED. The LED driver chip determines the next state of LED current according to three signals, namely, a driver chip PWM input signal, an EN pin low lever pulse input signal, and a present LED state and according to conversion conditions and a control signal output formula SS=EN_EFF, PWM_ACT, LAST_STATE_PWM, PWM_PIN, GA<1>, GA<62>.

The EN pin input signal is a low pulse control method for controlling the DC current of the LED to gradually increase and then gradually decrease at a certain speed. The PWM pin input is a level control method. When PWM high level is active, the LED current is set up when the PWM input is high logic, and the LED current is closed as 0 ampere when the PWM input is low logic. Similarly, when PWM low level is active, the LED current is set up when the PWM input is low logic and the LED current is closed as 0 ampere when the PWM input is high logic.

The EN and PWM pin input signals are able to control the output current state of the LED, but the EN input signal is prior to the PWM input signal. When the EN input signal controls the DC current of the LED from 0 ampere to gradually increase to the maximum output current, it is called as Fade In. When the EN input signal controls the DC current of the LED from the maximum output current to gradually decrease to 0 ampere, it is called as Fade Out. The PWM input is ignored.

After EN controls the DC current of the LED in Fade Out to gradually decrease to 0 ampere, the EN pin releases the control of the LED and asks the PWM signal to stay off for a certain time, so that the PWM can control the current of the LED to be set up or closed.

The LED driver chip divides the LED state into the following nine states:

(1) Initial OFF an initial off state, namely, an initial state of the driver chip, a Fade mode, an EN input signal controls the current of the LED current;

(2) Fade In: a state that the DC current of the LED is gradually increased, a state that the EN input signal controls the DC current of the LED to gradually increase;

(3) LED ON Due to Fade In: a state that the DC current of the LED reaches the maximum output value, the result that EN input enables the LED current;

(4) Fade Out: a state that the DC current of the LED is gradually decreased, a state that the EN input signal controls the DC current of the LED to gradually increase;

(5) LED On Due to PWM is ON: a state that the DC current of the LED is the maximum output value, the result that a PWM input enables the LED current;

(6) LED PWM Ramp Down: a state that a PWM input signal gets the control of the LED current and the duty cycle of the LED current is gradually decreased;

(7) LED Fade In From LED=0: a state that the DC current of the LED is gradually increased from 0 ampere, a state that the EN input signal controls the DC current of the LED to gradually increase;

(8) LED PWM Ramp Up: a state that PWM input signal gets the control of the LED current and the duty cycle of the LED current is gradually increased;

(9) LED PWM Mixed Fade Out: a state that the LED current is simultaneously controlled by the EN input signal and the PWM input signal.

The LED driver chip is accomplished by a state machine control circuit module for controlling the LED to switch among the nine states. The nine states have twenty-two paths for switching different working states (as shown in FIG. 2). The state conversion conditions and control signal output formula of the state machine are

SS=EN_EFF,PWM_ACT,LAST_STATE_PWM,
PWM_PIN,GA<1>,GA<62>

'0' denotes logic high; '1' denotes logic low; 'x' denotes any state to be set, namely, both '0', '1' are met.

The state conversion conditions and control signal output of the state machine is as the following table.

TABLE 1 the state conversion conditions and control signal output of the state machine

| state code | state | input of state machine input | output of state machine ||||| 
|---|---|---|---|---|---|---|---|
| | | | UP | RESET | SET | PWM_MODE | MIX_MODE |
| S0 | Initial OFF | SS=0xx100: next state<=S4(Enable PWM condition) SS=1xxxxx: next state<=S1 | 0 | 0 | 0 | 0 | 0 |
| S1 | Fade In | SS=0xxx11: next state<=S2 SS=1xxxxx: next state<=S3 | 1 | 0 | 0 | 0 | 0 |
| S2 | LED on due to fade In | SS=1xxxxxx: next state<=S3 | 1 | 0 | 0 | 0 | 0 |
| S3 | Fade Out | SS=1xxxxx: next state<=S1 SS=00x000: next state<=S0 (S3->S0,Ask for LED off and PWM stays OFF for 30ms) | 0 | 0 | 0 | 0 | 0 |
| S4 | LED on due to PWM is ON | SS=1xxxxx: next state<=S3 SS=00x0xx: next state<=S0 SS=010xxx: next state<=S7 SS=011xxx: next state<=S5 | 0 | S4->S0 output high pulse, the others output low level | 1 | 1 | 0 |
| S5 | LED PWM Ramp down | SS=00x0xx: next state<=S0 SS=00x1xx: next state<=S4 SS=1xxxxx: next state<=S6 | 0 | S5->S0 output high pulse, the others output low level | 1 | 1 | 0 |
| S6 | LED fade in From GA=0 | SS=0xxx11: next state<=S2 (And SS=PWM_CONTROL_GB=0) SS=1xxxxx: next state<=S3 | 1 | output high pulse | 0 | 0 | 0 |
| S7 | LED PWM Ramp Up | SS=000xxx: next state<=S0 SS=001xxx: next state<=S4 SS=11xxxx: next state<=S8 SS=10xxxx: next state<=S3 | 0 | S7->S0 output high pulse, the others output low level | 1 | 1 | 0 |
| S8 | LED PWM mixed fade out | SS=1xxxxx: next state<=S1 SS=000x00: next state<=S0 | 0 | 0 | 0 | 0 | 1 |

FIG. 3 is an application of the present invention, which is an LED driver chip of a car reading light. The LED driver chip has eight pins and a peripheral circuit. The eight pins are as shown in Table 2.

TABLE 2

| pin | definition |
|---|---|
| 1 | EN |
| 2 | ISET |
| 3 | TSTE_UP |
| 4 | TSET_DN |
| 5 | GND |
| 6 | OUT |
| 7 | VCC |
| 8 | PWM |

The connection relationship between the eight pins and the peripheral circuit is described hereinafter. VCC pin is connected to the power $V_{Battery}$. The power $V_{Battery}$ is connected with a voltage-regulator diode. The diode and a 10 μF capacitor are connected in parallel to form a voltage-stabilizing circuit, providing a protection function, such that when the diode is conducted, it will not suffer high current and high voltage impact. The voltage-regulator diode is to supply a stable DC voltage, and the voltage-regulator diode and a capacitor are connected in parallel to reduce the impulse current. PWM pin is connected with a level signal having a certain limit. EN pin is connected with a momentary contact switch. ISET pin is connected with a resistor $R_{ISET}$. The other end of the fast switch and the resistor and GND pin are grounded. OUT pin is connected to the car LED reading light as a load and then grounded. TSTE_UP pin and TSET_DN pin are connected with resistors $R_{TSTE\_UP}$, $R_{TSET\_DN}$ respectively and then grounded.

The function of each pin is described as follow:

The PWM input pin can control the output current of the OUT pin by means of level control. When the PWM input is logic high, the output current is set up, and when the PWM input is logic low, no current is output. When it is necessary to change the duty cycle of PWM to regulate the average current output from the current source, the frequency of the PWM input signal has a certain range of restriction, generally 50 Hz-300 Hz.

The EN input pin can control the output current state of the OUT pin. EN is low pulse to control the output current of the OUT pin. In order to filter out other noise interfering EN, EN must keep high level for at least T1 time and then become low level to be kept for at least T1 time (for example, T1=37 ms), such that it can control reversal of the output current state the OUT pin. If the OUT pin has current, the output current of the OUT pin is inverted and the current is gradually decreased to 0 (the power source is regulated to output DC current). If the OUT pin has no current, the output current of the OUT pin is inverted and the current is gradually increased until setup (the power source is regulated to output DC current).

The EN input pin controls the speed that the output current of the OUT pin is decreased or increased, which can be set by external resistors $R_{TSET\_UP}$ and $R_{TSET\_DN}$. $R_{TSET\_UP}$ can set the time period to gradually brighten the LED. $R_{TSET\_DN}$ LED can set the time period to gradually extinguish the LED.

The ISET input pin connects $R_{ISET}$ resistor to ground. $R_{ISET}$ resistor can set the output current of the OUT pin.

The OUT pin is the output pin of the current source, and is externally connected with the LED load to ground.

The state machine of the present invention functions as the main control unit. Both the PWM input signal and the EN input signal can control the change of the output current. The internal of the chip is provided with a state machine circuit. According to the PWM input signal and the EN input signal, in cooperation with the present state of the current source, the state machine will make the right decision to determine how to operate the current source.

FIG. 4 is a block diagram showing the driver chip according to the preferred embodiment of the present invention. The driver chip comprises hysteresis comparators 1, 3, a filtering and logic conversion module 2, a PWM (pulse width modulation) detection module 4, a state machine control circuit module 5, a state machine output logic module 6, a current on-off control logic circuit module 7, a current source module 8, and oscillators 12, 13, a bandgap reference voltage module 14, and a reference current circuit 15. The circuit connection and principle of each module are described as below.

The EN pin input is connected to the first hysteresis comparator 1. The first hysteresis comparator 1 converts the EN input level to output a logic signal. The logic signal output from the first hysteresis comparator 1 is input into the filtering and logic conversion module 2. The filtering and logic conversion module 2 outputs an EN-EFF signal which is used to control the current source output state.

The EN filtering mechanism is that: when the EN signal is converted from the low level to the high level, the time of the high level is kept over T1 time (for example, T1 can be set as 37 ms). It is deemed that the low lever input is converted to the high level input. Otherwise, the high level is shielded. Similarly, when the EN signal is converted from the high level to the low level, the time of the low level is kept over T1 time. It is deemed that the high lever input is converted to the low level input. Otherwise, the low level is shielded.

The logic conversion mechanism is that: when the filtered EN signal is detected to occur a falling edge, the EN-EFF signal is inverted.

The PWN pin input is connected to the second hysteresis comparator 3. The second hysteresis comparator 3 converts the PWN input level to output a logic signal. The logic signal output from the second hysteresis comparator 3 is input into the PWM detection module 4. The function of the PWM detection module 4 is to detect whether the PWM signal is inverted above the frequency F1 (for example, F1 is set as 30 Hz). In case of a reversion, the output signal PWM_ACT becomes a high level. In case of no reversion, the output signal PWM_ACT outputs a low level. PWM_LAST_STATE records the latest input state, motionless without reversion (the reversion frequency is less than the frequency F1).

The state machine control circuit module 5 is connected with the filtering and logic conversion module 2 and the PWM detection module 4. The input signals of the state machine control circuit module 5 include EN_EFF, PWM_ACT, PWM_LAST_STATE, GA[1], and GA[62]. The out signal of the state machine control circuit module 5 is CURRENT_STATE. The state machine control circuit module 5, according to the input signal and the present state, determines that what the next state is. When the next clock cycle comes, the next state gives the present state. The present state signal is output to the state machine output logic module 6.

The state machine output logic module 6 is connected with the state machine control circuit module 5. The input signal of the state machine output logic module 6 is CURRENT_STATE. The output signals of the state machine output logic module 6 include five signals, MIX_MODE, PWM_MODE, UP, SET, RESET. The state machine output logic module 6 reasonably controls the five output signals according to the present state. The details are described as below.

PWM_MODE signal: The high level is active. The current source is controlled to work in the PWM control mode. The PWM input controls the control current source to open or close. The duty cycle of the time to open the current source is controlled to regulate the average current value output from the current source, namely, AC control mode.

UP signal: When the PWM_MODE and MIX_MODE signals are low levels, the current source works in the DC control mode. When the UP signal becomes the high level, the DC current value output from the control current source is controlled to gradually increase until the maximum value. When the UP signal becomes the low level, the DC current value output from the control current source is controlled to gradually decrease until zero.

MIX_MODE signal: The high level is active. The current source is controlled to work in the AC and DC mixed control mode. When it works in the AC and DC mixed control mode, GA[62:1] controls the DC current value when the current source is opened. While, through regulation of the duty cycle, the PWM signal controls the average value of the current source. These two control ways simultaneously regulate the current output from the current source effectively.

The current on-off control logic circuit module 7 is connected with the state machine output logic module 6. The input signals of the current on-off control logic circuit module 7 include three digital signals, UP, SET, RESET. The output signal GA[62:1] of the current on-off control logic circuit module 7 is a 62-bit (or more than 62-bit, depending on the actual application environment) digital signal to control the current value output from the control source. The high level is active. When the UP signal becomes the high level from the low level, and both the SET and RESET signals are the low level, the current on-off control logic circuit module 7 controls the output signal GA[62:1] to orderly become the high level at a certain speed. The current output from the current source is controlled to increase gradually. Similarly, when the UP signal becomes the low level from the high level, and both the SET and RESET signals are the low level, the current on-off control logic circuit module 7 controls the output signal GA[62:1] to orderly become the low level at a certain speed. The current output from the current source is controlled to decrease gradually. For the SET and RESET signals, the high level is active. When the SET signal is the high level, the output signal GA[62:1] is controlled to be the high level. When the RESET signal is the high level, the output signal GA[62:1] is controlled to be the low level.

The current source module 8 has an input end connected with the current on-off control logic circuit module 7. The MIX_MODE signal and the PWM_MODE signal are input into a NOR gate 9. The output signal of the NOR gate 9 and the output signal of the second hysteresis comparator 3 are input into an OR gate 10. The OR gate 10 and the output signal GB[62:1] of the current on-off control logic circuit module 7 are input into a AND gate 11. The AND gate 11 is output to the current source module 8. The current source module 8 outputs the current to the OUT pin. The input signals of the current source module 8 include a digital signal GB[62:1] and analog signal reference current output from the reference current module. The digital signal GB[62:1] are 62 bits each controlling a small current source. The output current value of each small current source is unequal. The 62 bits orderly become the high level from the low level. The curve of the current variation is non-linear. The reference current is output from the reference current module. ISET connects a resistor $R_{ISET}$ to ground. Setting the $R_{ISET}$ resistor value can change the current value output from the current source.

The input of the first oscillator circuit module 12 includes a TSET_UP pin and a TSET_DN pin respectively connecting a resistor $R_{TSET\_UP}$ and a resistor $R_{TSET\_DN}$ to ground. The output signal of the first oscillator circuit module 12 is connected with the current on-off control logic circuit module 7. The resistor $R_{TSET\_UP}$ is set with the DC control mode of the current source. The speed of the current value from small to large is the speed to control the LED from dark to bright. Similarly, the resistor $R_{TSET\_DN}$ is set with the speed of the current value from big to small, namely, the speed to control the LED from bright to dark.

The second oscillator circuit module 13 is connected with the state machine control circuit module 5 and the PWM detection module 4 respectively to generate a reference frequency as the input clock of the state machine control circuit module 5 and the PWM detection module 4.

The bandgap reference voltage module 14 generates a reference voltage to the reference current circuit 15 and the oscillator circuit modules. The bandgap reference voltage module 14, the reference current circuit 15, and the oscillator circuit modules are connected with the current source module 8, respectively.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A state control method of an LED (light emitting diode) driver chip for a car reading light comprising, an OUT pin of the LED driver chip is connected to an LED; the LED driver chip, according to three signals, namely, a driver chip PWM input signal, an EN pin low lever pulse input signal, and a current LED state, and according to conversion conditions and a control signal output formula

SS=EN_EFF,PWM_ACT,LAST_STATE_PWM, PWM_PIN,GA<1>,GA<62> determining a next state of LED current; wherein the states of the LED driver chip includes:
(1) (S0) Initial OFF: an initial off state, namely, an initial state of the driver chip, a Fade mode, an EN input signal controlling the LED current;
(2) (S1) Fade In: a state that DC current of the LED is gradually increased, the EN input signal controlling the DC current of the LED to gradually increase;
(3) (S2) LED ON Due to Fade In: a state that the DC current of the LED reaches a maximum output value, the EN input enables the LED current;
(4) (S3) Fade Out: a state that the DC current of the LED is gradually decreased, the EN input signal controlling the DC current of the LED to gradually decrease;
(5) (S4) LED On Due to PWM is ON: a state that the DC current of the LED is the maximum output value, the PWM input enables the LED current;
(6) (S5) LED PWM Ramp Down: a state that a PWM input signal controls the LED current and the duty cycle of the LED current is gradually decreased;
(7) (S6) LED Fade In From LED=0: a state that the DC current of the LED is gradually increased from 0 ampere, the EN input signal controlling the DC current of the LED to gradually increase;
(8) (S7) LED PWM Ramp Up: a state that the PWM input signal controls the LED current and the duty cycle of the LED current is gradually increased;
(9) (S8) LED PWM Mixed Fade Out: a state that the LED current is simultaneously controlled by the EN input signal and the PWM input signal.

* * * * *